(12) United States Patent
Sun

(10) Patent No.: US 7,895,647 B2
(45) Date of Patent: Feb. 22, 2011

(54) KVM SWITCH

(75) Inventor: Shou-Chih Sun, Taipei (TW)

(73) Assignee: Aten International Co., Ltd. (TW)

( * ) Notice: Subject to any disclaimer, the term of this patent is extended or adjusted under 35 U.S.C. 154(b) by 838 days.

(21) Appl. No.: 11/778,241

(22) Filed: Jul. 16, 2007

(65) Prior Publication Data

US 2009/0024847 A1    Jan. 22, 2009

(51) Int. Cl.
G06F 9/00 (2006.01)
G06F 15/16 (2006.01)

(52) U.S. Cl. .......................... 726/12; 713/165
(58) Field of Classification Search .................. 726/12; 713/165
See application file for complete search history.

(56) References Cited

U.S. PATENT DOCUMENTS

| | | | |
|---|---|---|---|
| 4,769,883 A | 9/1988 | Nathanson et al. | |
| 5,740,246 A | 4/1998 | Saito | |
| 5,884,096 A | 3/1999 | Beasley et al. | |
| 6,073,188 A | 6/2000 | Fleming | |
| 6,378,009 B1 | 4/2002 | Pinkston, II et al. | |
| 6,378,070 B1 * | 4/2002 | Chan et al. | 713/155 |
| 2006/0218631 A1 | 9/2006 | Shih et al. | |
| 2006/0267936 A1 * | 11/2006 | Hoerl et al. | 345/158 |
| 2008/0052770 A1 * | 2/2008 | Ali et al. | 726/9 |

* cited by examiner

*Primary Examiner*—Christopher J Brown
(74) *Attorney, Agent, or Firm*—Chen Yoshimura LLP

(57) ABSTRACT

File management methods are disclosed, in which a host acquires at least one input signal from an input device via a keyboard-video-mouse (KVM) switch having a security key and determines whether the input signal comprises a first request for encrypting or decrypting at least one specific file. When the input signal comprises the first request by the host, the host acquires the security key from the KVM switch and encrypts or decrypts the specific file via the security key.

19 Claims, 3 Drawing Sheets ic
KVM SWITCH

BACKGROUND OF THE INVENTION

1. Field of the Invention

The invention relates to resource sharing, and in particular to a resource sharing apparatus capable of denying data to be accessed by any unauthorized third party.

2. Description of the Related Art

With rapid developments in information technology, computers are becoming more prevalent in both homes and offices and are often considered requisite "tools" for work, learning, leisure activities, and daily life. Sometimes a user may have more than one computer to process different tasks, often requiring access to multiple computers simultaneously. For example, a user may have a first computer dedicated for work, and a second computer limited to non-work activities, such as browsing the Internet and playing video games. Traditionally, each computer is equipped with one set of input/output (IO) peripheral devices comprising, generally, a keyboard, a mouse and a monitor. However, this is a waste of money (given similar function ability) and space if one has several computers. In order to solve such problems, keyboard-video-mouse (KVM) switches allow the same set of IO peripheral devices to interact with a selected computer.

BRIEF SUMMARY OF THE INVENTION

Embodiments of file management methods are provided, in which a host acquires at least one input signal from an input device via a keyboard-video-mouse (KVM) switch having a security key and determines whether the input signal comprises a first request for encrypting or decrypting at least one specific file. When the input signal comprises the first request, the host acquires the security key from the KVM switch and encrypts or decrypts the specific file via the security key.

The invention provides another embodiment of a resource sharing apparatus, in which a KVM switch is coupled to at least one input device and comprises at least one security key, and at least one host coupled to the input device via the KVM switch. When receiving a first request for encrypting or decrypting at least one specific file from the input device, the host acquires the security key from the KVM switch and encrypts or decrypts the specific file via the security key.

The invention provides another embodiment of a KVM switch coupled between at least one host and at least one input device, in which a security key storage stores at least one security key, and a control unit outputs the security key in the security key storage to the host when receiving a request from the host, such that the host encrypts or decrypts at least one specific file according to the security key.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
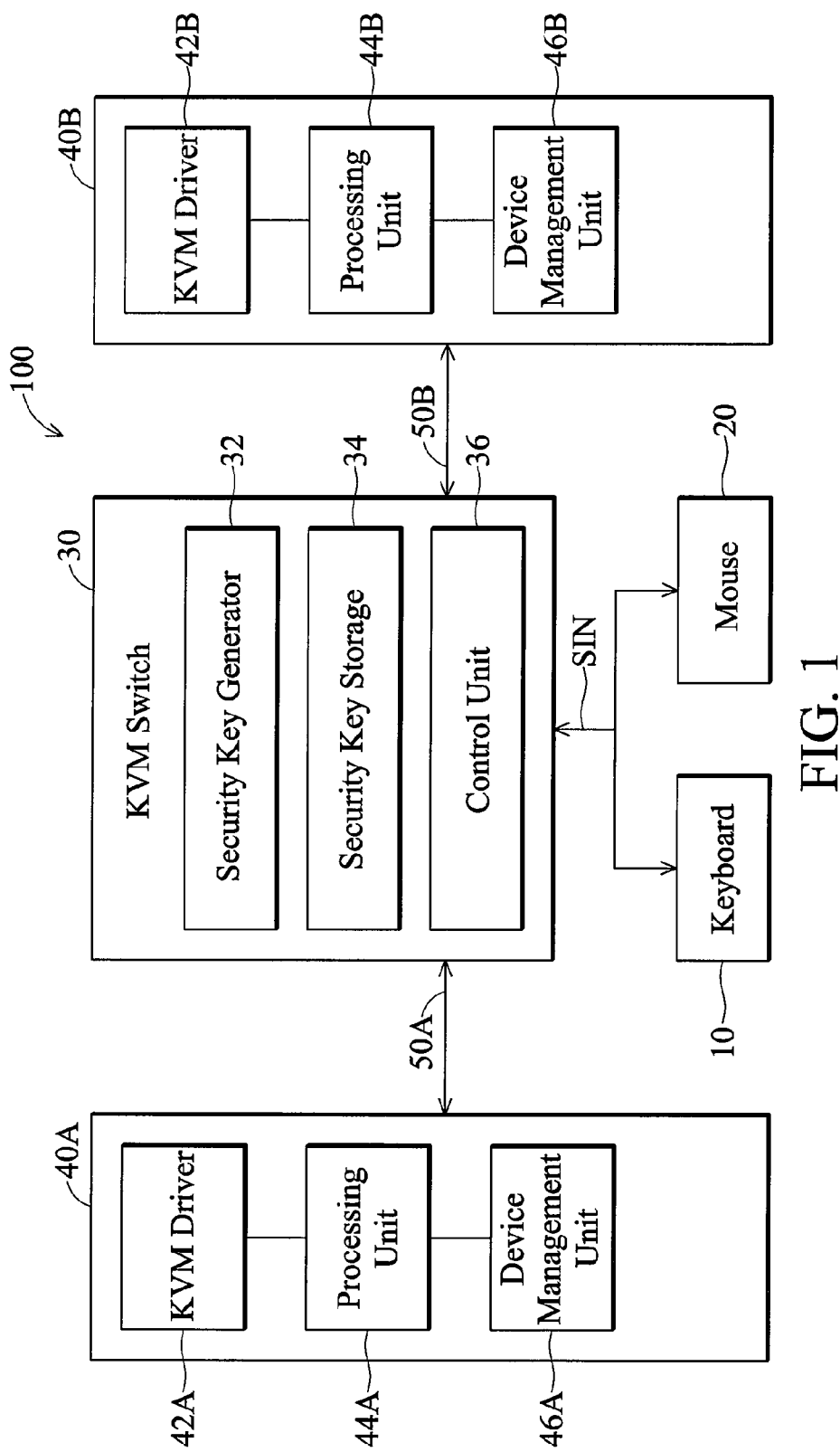
FIG. 1 shows an embodiment of a resource sharing apparatus.

FIG. 1 shows an embodiment of a resource sharing apparatus. As shown, the resource sharing apparatus 100 comprises at least one keyboard 10, at least one mouse 20, a keyboard-video-mouse (KVM) switch 30, and at least two hosts 40A and 40B. The number of the keyboard, the mouse and the host are not limited thereto. For example, the KVM switch 30 may be connected to at least one monitor.

The keyboard 10 and the mouse 20 serve as input devices of the resource sharing apparatus 100, but it is not limited thereto. For example, a keypad, a stylus, a touch panel or a monitor can also be used to serve as input devices of the resource sharing apparatus 100.

The KVM switch 30 is used to allow the same set of IO peripheral devices to interact with a selected one of several hosts (i.e., 40A or 40B) and provides a security key when receiving a predetermined request from the selected host, such that the selected host can encrypt or decrypt at least one specific file according to the security key. The KVM switch 30 receives at least one input signal SIN from the input devices (i.e., keyboard 10 and mouse 20), and the KVM switch 30 is coupled to the hosts 40A and 40B via predetermined interfaces 50A and 50B, respectively. For example, the predetermined interfaces 50A and 50B can be universal serial buses (USB), local area networks (LAN), Internet, Ethernet, wide area networks (WAN) wireless networks or cables, but is not limited thereto. The predetermined interfaces 50A and 50B may be the same or different. The KVM switch 30 switches the keyboard 10 and the mouse 20 to interact with the host 40A or 40B according to a switching command, hot key, OSD or specific button. The switching command, for example, can be a series of keystrokes, such as Ctrl+Ctrl+1, Ctrl+Ctrl+2, but is not limited thereto.

The KVM switch 30 comprises a security key generator 32, a security key storage 34 and a control unit 36. The security key generator 32 generates at least one security key according to a specific encryption/decryption standard and stores the generated security key to the security key storage 34. For example, the specific encryption/decryption standard can be advanced encryption standard (AES) or the data encryption stand (DES), but is not limited thereto. The control unit 36 switches the keyboard 10 and the mouse 20 to be connected to interact with the host 40A or 40B according to the switching command and outputs at least one security key in the security key storage 34 to the host 40A or 40B when receiving a security key request (not shown in FIG. 1) from the host 40A or 40B. For example, the security key request is generated by the host 40A when the host 40A receives an input signal comprising a request for encrypting or decrypting at least one specific file from the input devices (i.e. the keyboard 10 or the mouse 20). The security key request can also be generated by the host 40B when the host 40B receives an input signal comprising a request for encrypting or decrypting at least one specific file from the input devices. In this embodiment, the request for encrypting or decrypting at least one specific file is referred to as a first request hereinafter.

The hosts 40A and 40B are coupled to the KVM switch 30 via the predetermined interfaces 50A and 50B, respectively, and the hosts 40A and 40B acquire the security key from the KVM switch 30 to encrypt or decrypt at least one specific file when receiving the input signal with the first request from the keyboard 10 or the mouse 20. The host 40A comprises a KVM driver 42A, a processing unit 44A and a device management unit 46A, and the host 40B comprises a KVM driver 42B, a processing unit 44B and a device management unit 46B. The hosts 40A and 40B, for example, can be desktop computers, servers or portable computers such as notebooks, tablet PCs, palmtops, personal digital assistant (PDA), cellular phone, mobile device or UMPC, but are not limited thereto.

The KVM driver 42A is coupled to the processing unit 44A, acquiring a security key from the KVM switch 30 when being triggered by the processing unit 44A. The processing unit 44A triggers the KVM driver 42A to acquire the security key from the KVM switch 30 when receiving the input signal with the first request from the keyboard 10 or the mouse 20, and the KVM driver 42A then encrypts or decrypts the specific file according to the acquired security key provided by the KVM switch 30. The device management unit 46A manages the input devices (i.e. keyboard 10 and mouse 20) when they are switched to interact with the host 40A. For example, the device management unit 46A can be a USB controller enumerating the input devices supporting the USB interface when they are switches to interact with the host 40A.

Similarly, the KVM driver 42B is coupled to the processing unit 44B, acquiring at least one security key from the KVM switch 30 when being triggered by the processing unit 44B. The processing unit 44B triggers the KVM driver 42B to acquire the security key from the KVM switch 30 when receiving the input signal with the first request from the keyboard 10 or the mouse 20 and then encrypts or decrypts the specific file according to the acquired security key provided by the KVM switch 30. The device management unit 46B manages the input devices (i.e. keyboard 10 and mouse 20) when they are switched to interact with the host 40B. For example, the device management unit 46B can be a USB controller enumerating the input devices supporting the USB interface when they are switches to interact with the host 40B.

Namely, when the host 40A (or 40B) receives the input signal with the first request from the keyboard 10 or the mouse 20, the processing unit 44A (or 44B) triggers the KVM driver 42A (or 42B) to acquire the security key from the KVM switch 30, and then the KVM driver 42A (or 42B) encrypts or decrypts the specific file according to the acquired security key form the KVM switch 30.

Thus, data in the host 40A or 40B can be encrypted or decrypted by a security key from the KVM switch 30, and the encrypted data would not be decrypted when the host 40A or 40B is not connected to the KVM switch 30, thereby denying data access by any unauthorized third party.

Figure 2:
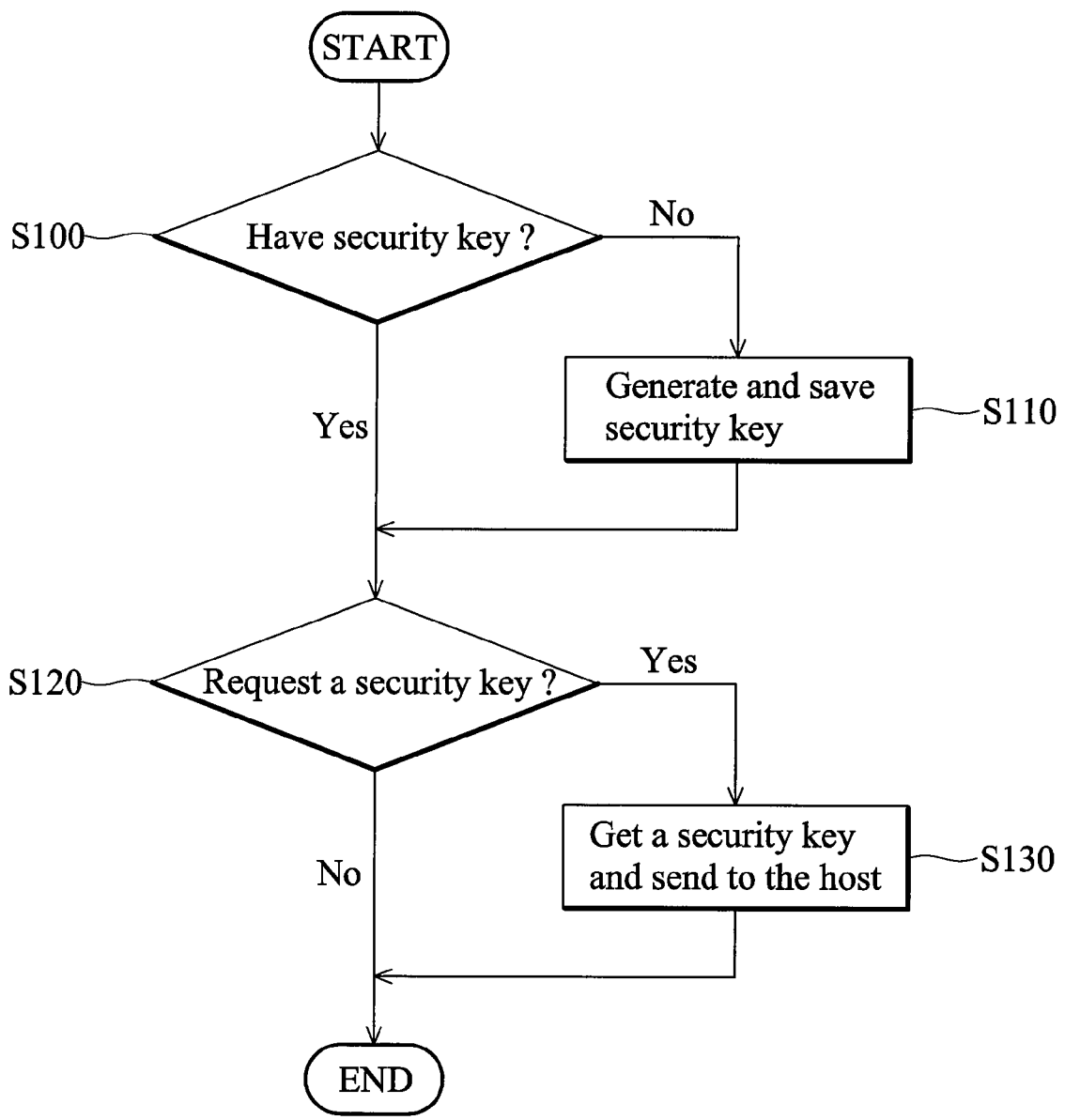
FIG. 2 shows operation of the KVM switch in the embodiment.

FIG. 2 shows operations of the KVM switch in a file management method of the embodiment.

In step S100, the control unit 36 determines whether there is at least one security key in the security key storage 34. If the security key storage 34 has at least one security key, step S120 is then executed. If not, the control unit 36 enables the security key generator 34 to generate at least one security key according to a specific encryption/decryption standard and store the generated security key to the security key storage 34. For example, the specific encryption/decryption standard can be advanced encryption standard (AES) or the data encryption stand (DES), but is not limited thereto. In step S120, the control unit 36 determines whether there is a security key request (not shown) from the hosts 40A or 40B. If there is no security key request from the hosts 40A or 40B, the process is ended. If control unit 36 in the KVM switch 30 receives the security key request from the host 40A or 40B, step S130 is then executed. In step S130, the control unit 36 acquires a security key from the security key storage 34 and sends it to the host 40A or 40B that provides the security key request to the KVM switch 30.

Figure 3:
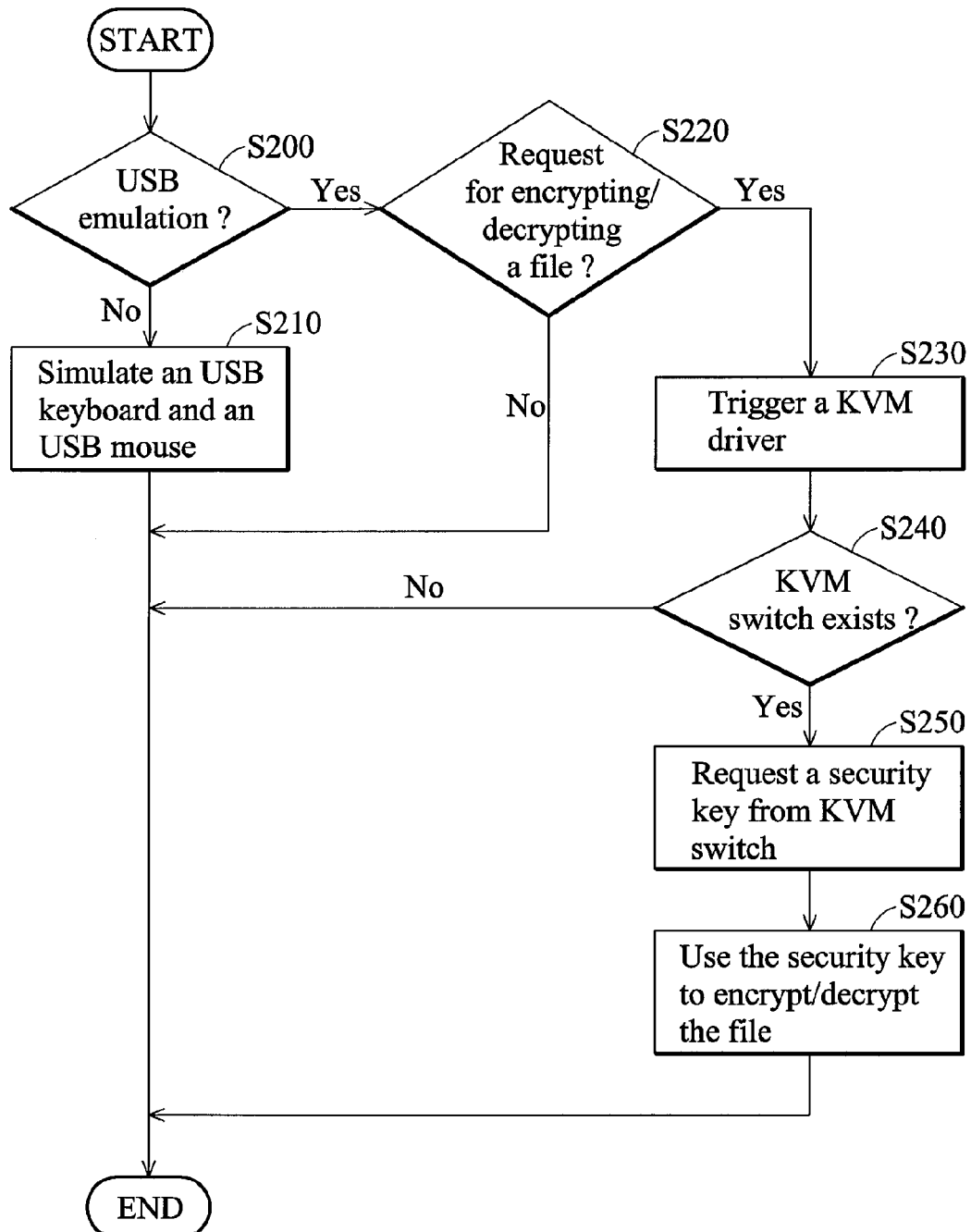
FIG. 3 shows a flowchart of an embodiment of a file management method according to the invention.

FIG. 3 shows a flowchart of an embodiment of a file management method according to the invention. The above operations are described by the host 40A with reference to FIG. 1, but they can also be executed by the host 40B.

In step S200, the host 40A determines whether the USB devices are emulated. If no USB device is emulated by the device management unit 46A, step S210 is executed. In step S210, the host 40A simulates an USB keyboard and an USB mouse and the process goes to the end. Alternatively, step S220 is executed if the host 40A determines that at least one USB device is emulated, (i.e., the keyboard 10 and/or the mouse 20 is switched to be interacted with to the host 40A).

In step S220, the host 40A determines whether there is a request for encrypting or decrypting at least one file in a received input signal. In this embodiment, the request for encrypting or decrypting a file in a received input signal is referred to as a first request hereinafter. For example, the host 40A acquires an input signal SIN from the input device (i.e. the keyboard 10 and/or the mouse 20) via the KVM switch 30, and the processing unit 44A then determines whether the received input signal from the input device has the first request.

If the received input signal has no first request, the process goes to the end. Alternatively, step S230 is executed if the received input signal has the first request. In step S230, the KVM driver 42A is triggered to obtain at least one security key from the KVM switch 30. For example, the processing unit 44A triggers the KVM driver 42A to obtain the security key from the KVM switch 30 when the received input signal from the input device has the first request. Then, step S240 is executed.

In step S240, the KVM driver 42A determines whether a connection between the KVM switch 30 and host 40A exists. For example, after the KVM driver 42A is triggered to obtain the security key from the KVM switch 30, the KVM driver 42A detects whether a connection between the KVM switch 30 and the host 40A exists. If there is a connection between the KVM switch 30 and the host 40A, step S150 then is executed. If not, the process goes to the end.

In step S250, the KVM driver 42A outputs a security key request to the KVM switch 30 for a security key. For example, when receiving the security key request from the KVM driver 42A, the control unit 36 in the KVM switch 30 acquires a security key from the security key storage 34 and provides (or sends) it to the KVM driver 42A.

In step S260, the KVM driver 42A encrypts or decrypts the specific file according to the security key from the KVM switch 30. For example, when receiving the security key from the KVM switch 30, the KVM driver 42A uses the obtained security key to encrypt or decrypt the specific file according to the specific encryption/decryption standard, such as advanced encryption standard (AES) or the data encryption stand (DES).

It should be noted that a step of detecting whether the KVM switch exists is executed by the host before step S200. The process is ended when the host detects that no KVM switch exists. The process is proceeded into step S200 when the host detects that the KVM switch exists. It is need to be understood the operations in steps S200~S260 and the abovementioned step of detecting whether the KVM switch exists can also be executed by the host 40B, and are omitted for simplification.

Because data in the host 40A or 40B can be encrypted or decrypted by a security key from the KVM switch 30, the encrypted data would not be decrypted when the host 40A or 40B is not connected to the KVM switch 30, thereby denying data access by any unauthorized third party.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A file management method, comprising:
   acquiring at least one input signal by a host from an input device via a keyboard-video-mouse (KVM) switch coupled to the input device, the KVM having a storage for saving a security key and a control unit for outputting the security key;
   determining whether the input signal comprises a first request for encrypting/decrypting at least one specific file by the host;
   acquiring the security key from the KVM switch by the host when the input signal comprises the first request; and
   encrypting or decrypting the specific file via the security key by the host.

2. The file management method of claim 1, further comprising:
   determining whether the KVM switch is connected to the host by the host before the step of acquiring the security key.

3. The file management method of claim 1, wherein the input device comprises a keyboard, a monitor or a mouse.

4. The file management method of claim 1, wherein the step of acquiring the security key further comprises:
   outputting a second request to the KVM switch by the host to obtain the security key when the first input signal comprises the first request.

5. The file management method of claim 4, further comprising:
   determining whether the security key is stored in the KVM switch by the KVM switch; and
   generating the security key according to a specific encryption/decryption standard by the KVM switch.

6. The file management method of claim 5, further comprising:
   outputting the security key to the host by the KVM switch when the KVM switch receives the second request.

7. The file management method of claim 1, wherein the specific encryption/decryption standard is advanced encryption standard (AES) or data encryption standard (DES).

8. A resource sharing apparatus, comprising:
   a keyboard-video-mouse (KVM) switch coupled to at least one input device and comprising a storage for saving at least one security key and a control unit for outputting the at least one security key; and
   at least one host coupled to the input device via the KVM switch, when receiving a first request for encrypting or decrypting at least one specific file from the input device, acquiring the security key from the KVM switch and encrypting or decrypting the specific file via the security key.

9. The resource sharing apparatus of claim 8, wherein the input device comprises a keyboard, a monitor or a mouse.

10. The resource sharing apparatus of claim 8, wherein the KVM switch further comprises a security key generator generating the security key according to a specific encryption/decryption standard and storing to the security key storage.

11. The resource sharing apparatus of claim 10, wherein the specific encryption/decryption standard is advanced encryption standard (AES) or data encryption standard (DES).

12. The resource sharing apparatus of claim 10, wherein the host comprises:
   a KVM driver; and
   a processing unit triggering the KVM driver to acquire the security key from the KVM switch and encrypt or decrypt the specific file via the security key when receiving the first request.

13. The resource sharing apparatus of claim 12, wherein the KVM driver determines whether the KVM switch is connected to the host before acquiring the security key.

14. The resource sharing apparatus of claim 12, wherein the KVM driver outputs a second request to the KVM switch to require the security key, and the KVM switch outputs the security key in the security key storage to the host when receiving the second request.

15. A keyboard video mouse (KVM) switch coupled between at least one host and at least one input device, comprising:
   a non-transitory security key storage medium storing at least one security key; and a control unit outputting the at least one security key in the security key storage to the host when receiving a request from the host;
   determining whether the input signal from the input device comprises a first request for encrypting/decrypting at least one specific file by the host; and
   sending the security key from the KVM switch to the host when the input signal comprises the first request such that the host encrypts/decrypts at least one specific file via the security key.

16. The KVM switch of claim 15, wherein the specific encryption/decryption standard is advanced encryption standard (AES) or data encryption standard (DES).

17. The KVM switch of claim 15, wherein the input device comprises a keyboard, a monitor or a mouse.

18. The KVM switch of claim 15, further comprising a switch unit routing signals between the host and the input device.

19. The KVM switch of claim 15, further comprising a security key generator generating the security key according to a specific encryption/decryption standard.

* * * * *